Jan. 13, 1959  W. FALL  2,868,101
VENTILATING ARRANGEMENT FOR PASSENGER VEHICLES
Filed Jan. 29, 1954  4 Sheets-Sheet 1
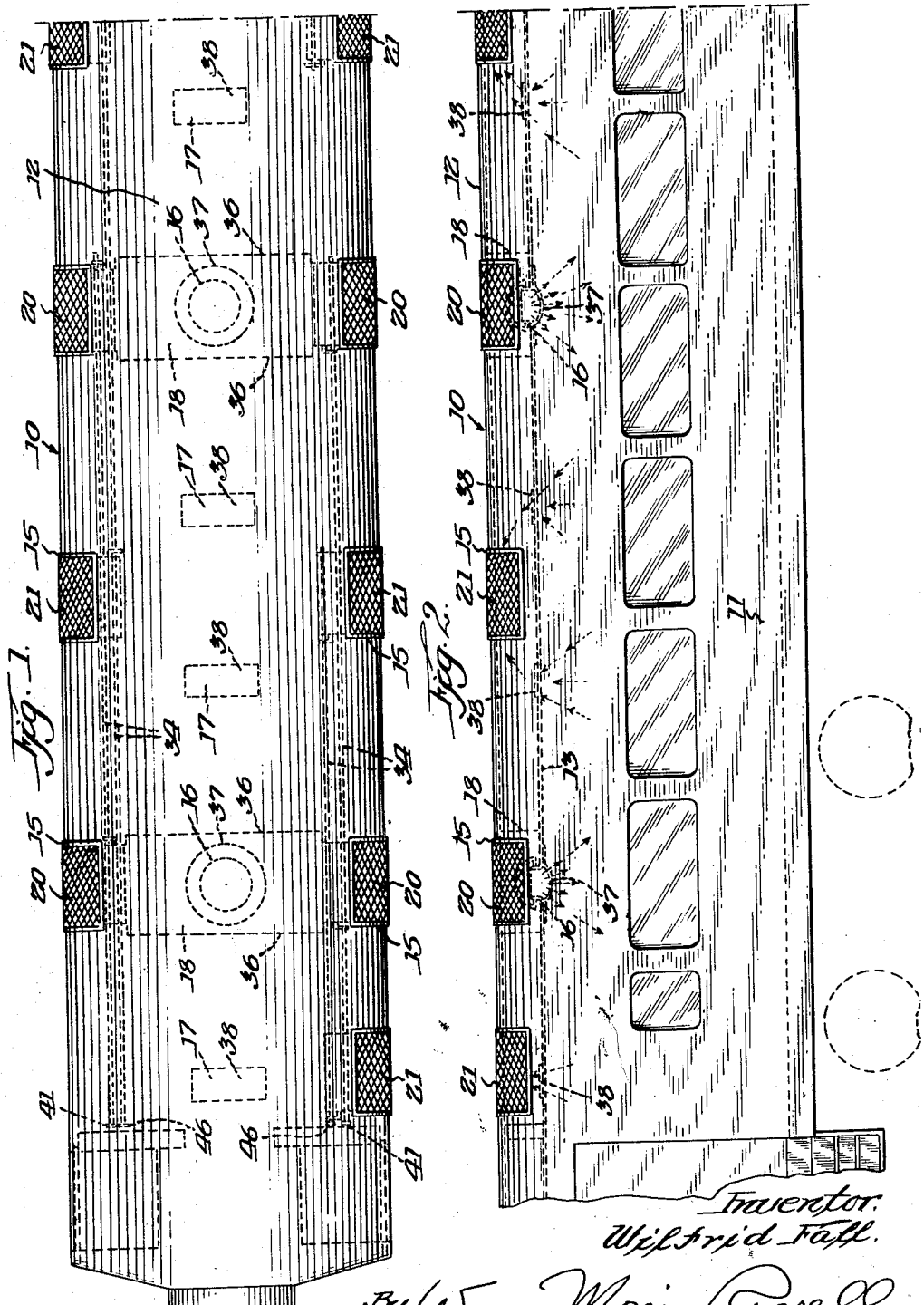

Jan. 13, 1959 W. FALL 2,868,101
VENTILATING ARRANGEMENT FOR PASSENGER VEHICLES
Filed Jan. 29, 1954 4 Sheets-Sheet 2
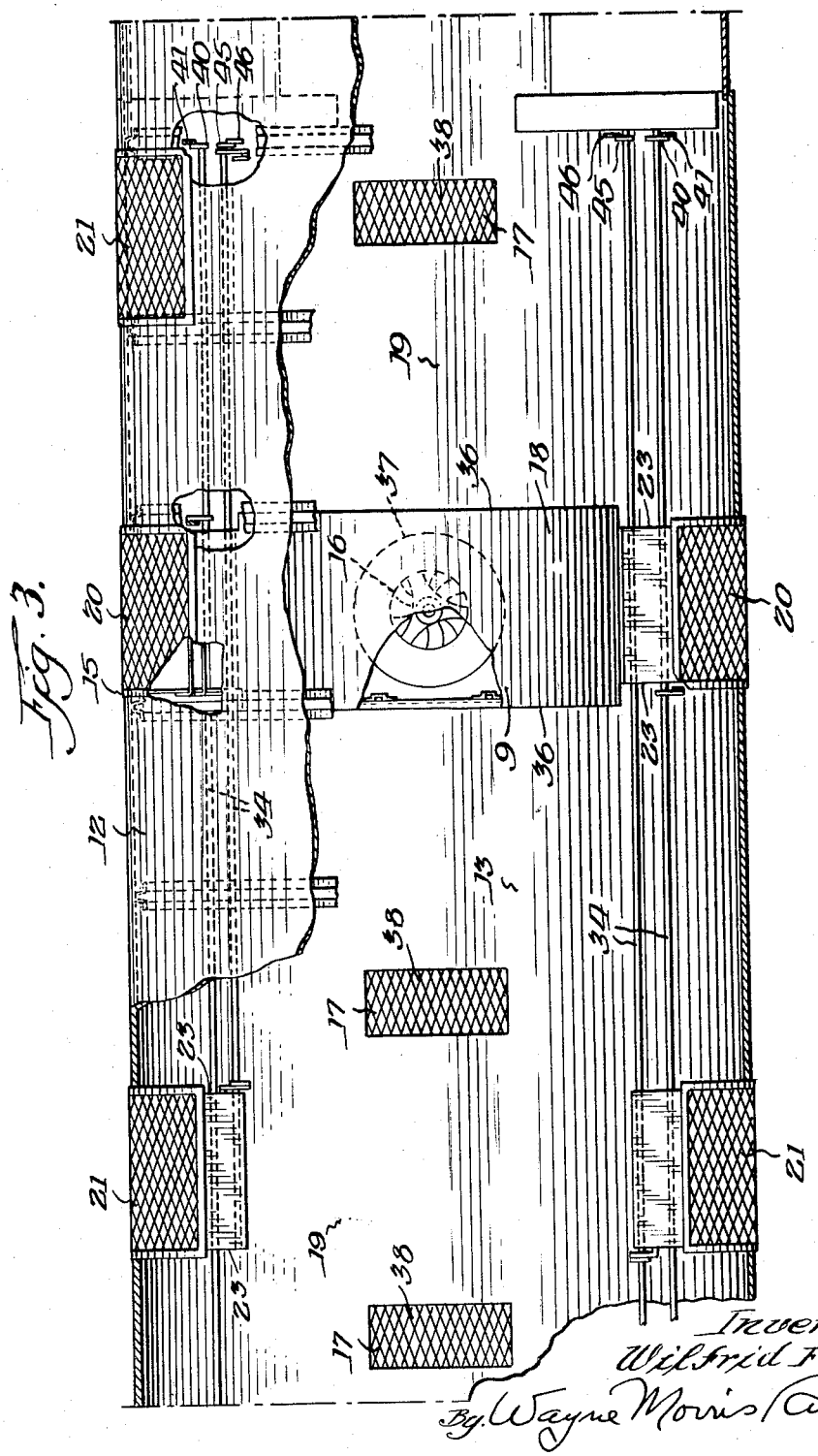

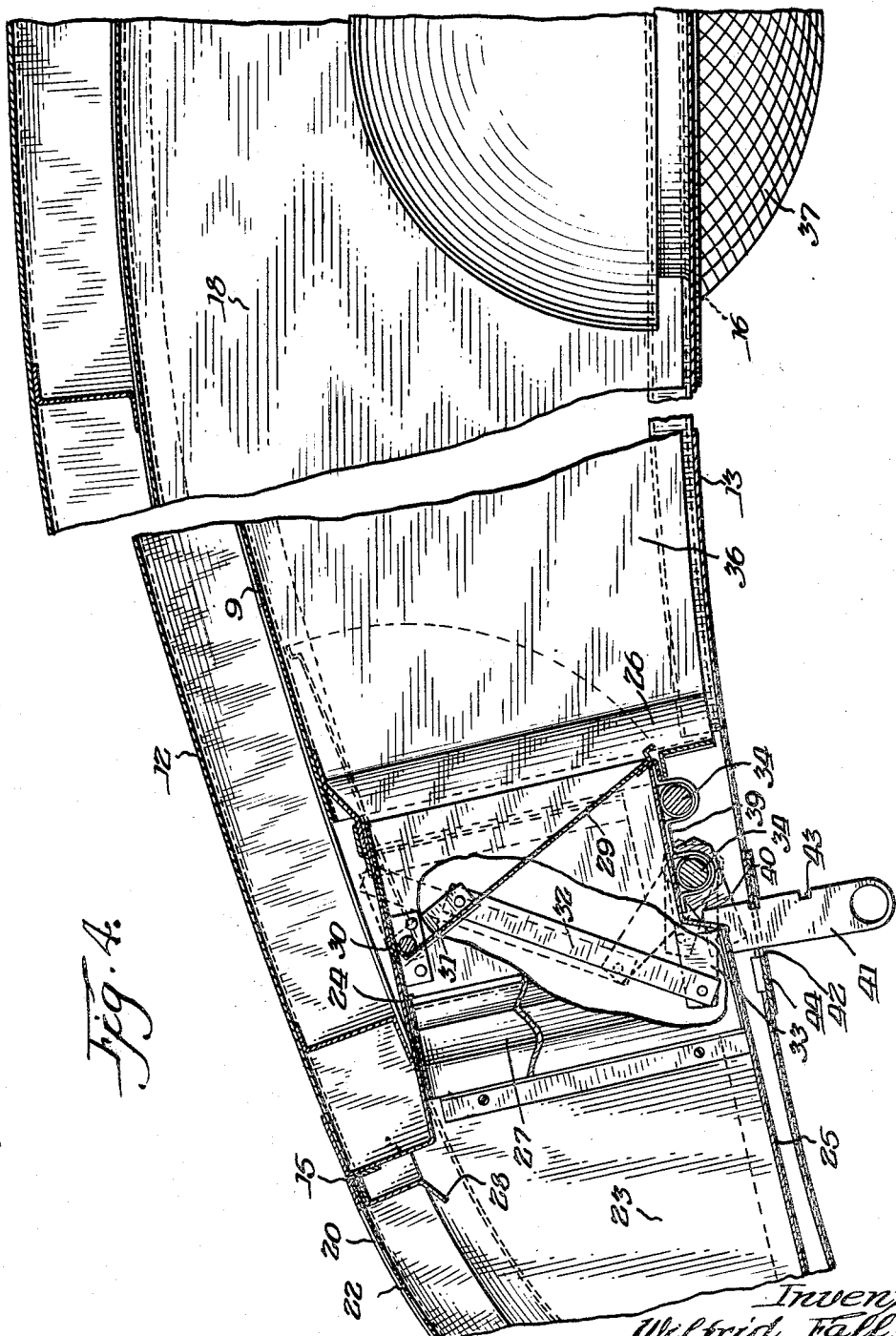

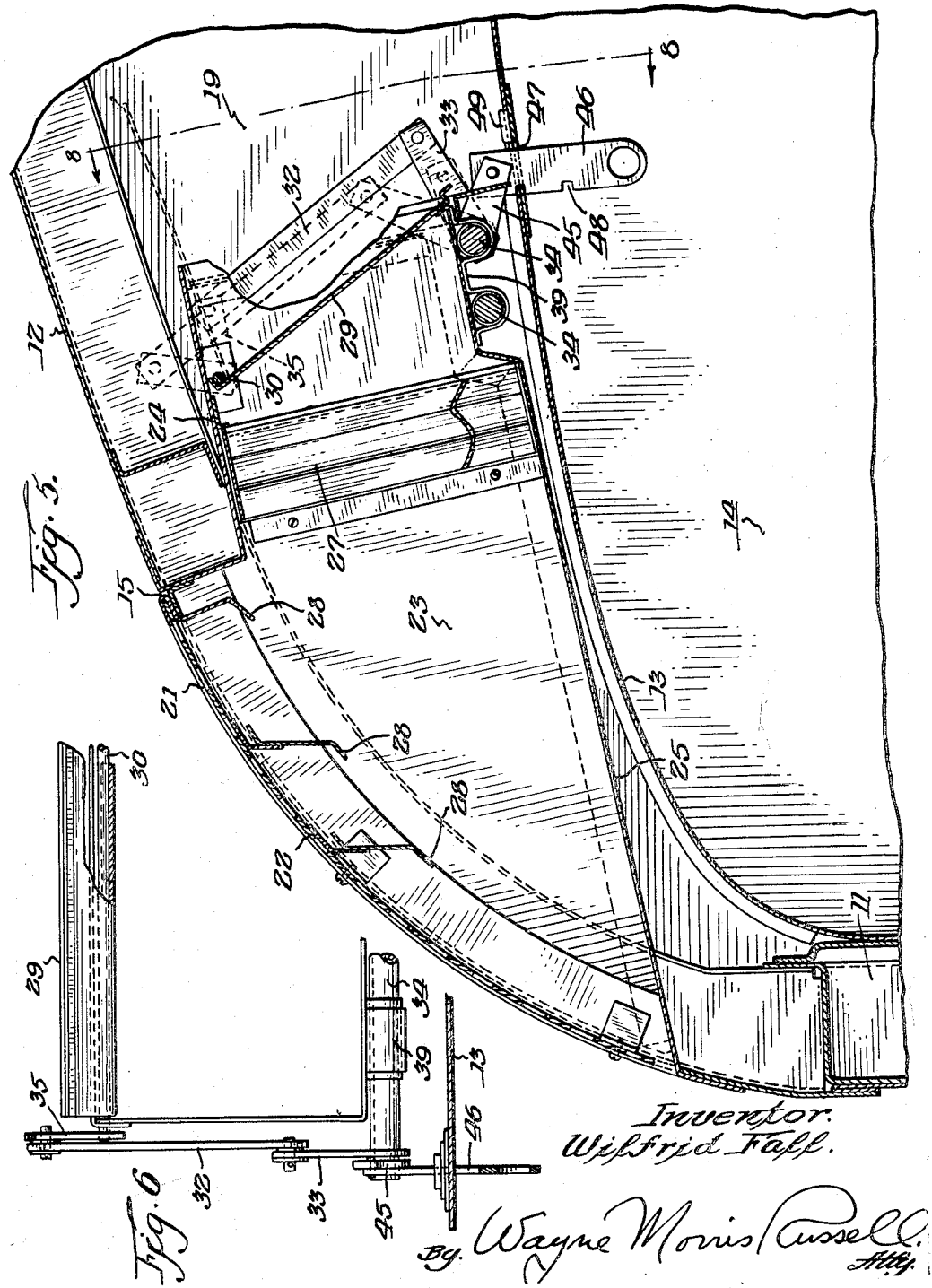

United States Patent Office 2,868,101
Patented Jan. 13, 1959

2,868,101

VENTILATING ARRANGEMENT FOR PASSENGER VEHICLES

Wilfrid Fall, Worcester, Mass., assignor to Pullman-Standard Car Manufacturing Company, Chicago, Ill., a corporation of Delaware Application January 29, 1954, Serial No. 406,989

3 Claims. (Cl. 98—10)

This invention relates to a ventilating arrangement for a passenger vehicle and is primarily concerned with a ventilating arrangement for a railway passenger car.

The principal object of the invention is to provide a ventilating arrangement for a passenger vehicle which is flush with the roof of a vehicle.

Another object of the invention is to provide transversely extending alternating intake and exhaust ventilating compartments between the roof and ceiling of a passenger vehicle.

A further object of the invention is to provide a ventilator for a passenger vehicle having a novel construction and arrangement of elements.

An important object of the invention is to provide in a passenger vehicle having a number of ventilators means for operating a plurality of the ventilators simultaneously.

The foregoing and other objects of the invention are attained by the construction and arrangement illustrated in the accompanying drawings wherein:

Fig. 1 is a plan view of the complemental halves of a railway passenger car showing the alternating intake and exhaust compartments;

Fig. 2 is a side elevational view of the complemental halves of the railway passenger car shown in Fig. 1;

Fig. 3 is a plan view of a portion of the car at one end showing part of the means for operating the ventilating arrangement;

Fig. 4 is a cross sectional view through one of the intake ventilators;

Fig. 5 is a cross sectional view through one of the exhaust ventilators; and

Fig. 6 is a sectional view taken on the line 8—8 of Fig. 5.

The invention proposes a ventilating arrangement for a passenger vehicle. The space between the roof and the ceiling of the vehicle is divided into a plurality of transversely extending alternating intake and exhaust compartments. Intake ventilators are positioned in the intake compartments flush with the roof of the vehicle and one or more exhaust ventilators is positioned in each exhaust compartment flush with the roof of the vehicle. A fan is mounted in the ceiling at each intake compartment and apertures in the ceiling are in communication with the exhaust compartments. The intake and exhaust ventilators are of similar construction and each comprises a screen positioned flush with an opening in the roof and a fin grille extending transversely across the respective compartment and spaced baffle plates positioned between the screen and the grille and a damper between the grille and the opening or aperture in the ceiling. Air enters the vehicle through the intake ventilators and is moved into the passenger space of the vehicle by the fans and leaves the vehicle through the exhaust ventilators.

In the drawings, 10 generally designates a passenger vehicle or railway passenger car having the usual trucks, a floor, seats on the floor, side walls 11 having the usual windows, a roof 12, a ceiling 13 spaced below the roof, a passenger space 14 between the floor and the ceiling, and doorways at each end of the car with steps leading to the doorways. The roof 12 is provided with a plurality of spaced openings 15 adjacent each side wall 12 and the ceiling 13 is provided with an opening 16 between alternating pairs of opposed openings 15 in the roof located adjacent opposite side walls and a pair of spaced rectangular-shaped apertures 17 are provided in the ceiling between openings 16 except at each end of the car when there is only one aperture.

A pair of spaced partitions are positioned between the ceiling 13 and the roof 12 on opposite sides of each opening 16 in the ceiling dividing the space between the roof and the ceiling into a plurality of spaced intake compartments 18 with an exhaust compartment 19 alternating between the intake compartments. Intake ventilators 20 are positioned in each intake compartment 18 at the openings 15 in the roof 12 and exhaust ventilators 21 are positioned in each exhaust compartment 19 at the openings 15 in the roof. Each intake ventilator 20 comprises an expanded metal screen 22 positioned over the respective opening 15 in the roof 12 flush with the roof. A pair of vertically disposed walls 23 are positioned on opposite sides of the opening 15 and each wall has one end bearing against the roof. A top wall 24 has one flange bent over on the outer surface of the roof 12 and has another portion normal to the roof and then the remaining portion of the wall is positioned upon and extends between the walls 23. A bottom wall 25 has one flange bent over on the outer surface of the roof 12 and the remaining portion extends between the walls 23 and at its inner extremity it is bent upwardly to conform to the cut out in the lower edges of the walls 23. The vertically disposed walls 23 and the top wall 24 and the bottom wall 25 together form a housing and a rectangular-shaped frame 26 has flanges which encircle the housing. A grille 27 having a plurality of spaced fins of a zig-zag shape extends across the housing and the purpose of the grille 27 is to prevent the entrance of moisture or water into the car. A plurality of spaced baffle plates 28 are positioned between the screen 22 and the grille 27 and these baffle plates are secured to the screen. A damper 29 is positioned between the grille 27 and the adjacent opening 16 in the ceiling 13. A pivot pin 30 extends between and projects through the vertically disposed walls 23 and the damper 29 has one side secured to the pin. A link 31 comprising an operating arm is positioned longitudinally of the damper 29 at its pivoted side and is fixedly secured to the damper. A link 32 has one end pivotally connected to the arm 31 and a lever arm 33 has one end pivotally connected to the other end of the link 32 and the other end of the lever arm is fixedly secured to a rod 34. The linkage mechanism consisting of the members 31, 32, and 33 is positioned outside of the housing adjacent one of the vertically disposed walls 23. The exhaust ventilators 21 are of the same construction as the intake ventilators 20 except that the operating arm 35 is arranged at an angle with respect to the damper 29 as best shown in Fig. 7 whereas the arm 31 on the intake ventilators is positioned longitudinally of the damper. A pair of walls 36 extend between opposite walls 23 on a pair of intake ventilators 20 and a top wall 9 is secured to the pair of walls 36 and extends between the four walls 23 on the pair of ventilators and the four walls 23 and the two walls 36 and the top wall 9 together form one of the intake compartments 18. A fan 37 is mounted in each of the openings 16 in the ceiling 13 at each of the intake compartments 18. A screen 38 is secured in each of the apertures 17 in the ceiling 13. There are a total of eight rods 34 in the car and four of the rods extend from one end of the car and terminate in the area of the center of the car and the other four rods extend from the other end of the car and terminate in the area of the center of the car.

A bracket 39 is secured to the bottom wall 25 of all of the intake and exhaust ventilators 20 and 21 and each of the brackets has a pair of U-shaped seats. One rod 34 is seated in one of the U-shaped seats in two of the brackets 39 and the arm 33 on two adjacent intake ventilators 20 is fixedly secured to the rod. An actuating arm 40 at one end of the car has one end fixedly secured to the rod 34 and a handle 41 has one end pivotally connected to the arm and the handle projects through a slot 42 in the ceiling 13. The handle 41 has a pair of spaced notches 43 in one side edge and a spring biased catch 44 is secured to the ceiling 13 and urges the adjacent notch in the handle and the wall of the slot into engagement to lock the handle so that the dampers 29 on the intake ventilators 20 may be held in either open or closed position. Movement of the handle 41 causes rotation of the rod 34 resulting in movement of the dampers 29 on two intake ventilators 20 to open or closed positions simultaneously. Another rod 34 is seated in the other of the U-shaped seats in the same two brackets 39 and the lever arm 33 on the two adjacent exhaust ventilators 21 is fixedly secured to the rod. An actuating arm 45 at the same end of the car is fixedly secured to the rod 34 and a handle 46 is pivotally connected to the arm and the handle projects through a slot 47 in the ceiling 13. The handle 46 has notches 48 and a spring biased catch 49 is secured to the ceiling 13. Movement of the handle 46 results in movement of the dampers 29 on two exhaust ventilators 21 to open or closed positions simultaneously. The other three pairs of rods 34 are connected to the remaining intake or exhaust ventilators 20 and 21 in a similar manner.

To operate the ventilating arrangement the trainman opens the dampers 29 on both the intake and exhaust ventilators 20 and 21 by moving the handles 41 and 46. Intake air enters the car at the intake ventilators 20 through the screen 22 and contacts the baffle plates 28 and then passes through the fins in the grille 27 and then the fan 37 moves the air into the passenger space 14 of the car. The exhaust air is moved by the static pressure in the car and goes out through the screens 38 and then through the grille 27 past the baffle plates 28 and finally through the screen 22. As few as two intake ventilators 20 and two exhaust ventilators 21 may be in use at one time or all of the intake ventilators and all of the exhaust ventilators may be in use at one time according to the amount of ventilation required.

The outstanding advantage of the present ventilating arrangement is that all of the ventilators, both intake and exhaust, are disposed flush with the roof of the car. Automatic washing brushes for railway passenger cars are now being widely used and if the ventilators were situated exteriorly of the car they would be damaged by the brushes. Since the ventilators of the present invention are disposed interiorly of the car and flush with the roof of the car, they will not be damaged by the automatic washing brushes and the fin grilles will prevent the entrance of any water into the passenger space. If the water from the automatic washing brushes gets as far as the fin grille, it will be stopped there and since the bottom wall of each ventilator is sloped, the water will run toward the outside of the car. Since two intake ventilators, or two exhaust ventilators, may be operated simultaneously the trainman's time will be saved as he may be needed at other stations in the car.

From the foregoing it will be seen that there has been provided a ventilating arrangement which is flush with the roof of the car having ventilators of novel construction certain pairs of which may be operated simultaneously.

What is claimed is:

1. In a passenger vehicle, a pair of spaced vertically disposed walls, a top wall extending between the vertically disposed walls, a bottom wall extending between the vertically disposed walls, the vertically disposed walls and the top and bottom walls together forming a housing, a damper pivotally mounted by pivot means adjacent its top edge supported in the vertically disposed walls, an operating arm positioned longitudinally of the damper adjacent one side thereof and secured to the damper, a link having one end pivotally connected to said arm, a lever arm having one end pivotally connected to the other end of said link, a rod rotatably mounted on the bottom wall and the other end of the lever arm being fixedly secured to the rod, an actuating arm having one end fixedly secured to the rod, and a handle pivotally connected to said actuating arm, movement of the handle causing the damper to move between open or closed positions in the housing.

2. In a passenger vehicle, a roof, a pair of ventilators positioned interiorly of the vehicle and spaced longitudinally thereof and each comprising a pair of spaced vertically disposed walls depending from the roof and a bottom wall extending between the vertically disposed walls and a damper pivotally connected by pivot means adjacent its top edge supported in the vertically disposed walls and an operating arm operatively connected to the damper, a link pivotally connected at one end to the arm, a bracket mounted on the bottom wall of each ventilator, and a rod extending between the ventilators and rotatably mounted in the brackets on the ventilators, and a lever arm operatively connected to the rod, the link of each ventilator being pivotally connected at its opposite end to the lever arm, rotation of the rod causing movement of the dampers on both ventilators to open or closed positions simultaneously.

3. In a passenger vehicle, a roof, a ceiling spaced below the roof and provided with a slot, a pair of spaced ventilators positioned between the ceiling and the roof and each comprising a pair of spaced vertically disposed walls depending from the roof and a bottom wall extending between the vertically disposed walls and a damper pivotally connected by pivot means adjacent its top edge supported in the vertically disposed walls and an operating arm operatively connected to the damper, a link pivotally connected at one end to the arm, a bracket mounted on the bottom wall of each ventilator, a rod extending between the ventilators and rotatably mounted in the brackets on the ventilators, a lever arm operatively connected to the rod, the link of each ventilator being pivotally connected at its opposite end to said lever arm on the rod, an actuating arm fixedly secured to the rod, a handle pivotally connected to said actuating arm and extending through the slot in the ceiling and having spaced notches, and a spring biased catch mounted on the ceiling and urging the adjacent notch on the handle and the wall of the slot into engagement, movement of the handle causing rotation of the rod resulting in movement of the dampers on both ventilators to open or closed positions simultaneously.

References Cited in the file of this patent

UNITED STATES PATENTS

| | | |
|---|---|---|
| 295,061 | Slater | Mar. 11, 1884 |
| 793,982 | Bennett | July 4, 1905 |
| 818,229 | Chadborn | Apr. 17, 1906 |
| 1,389,788 | Steger | Sept. 6, 1921 |
| 1,500,032 | Poehner | July 1, 1924 |
| 1,955,088 | Pine et al. | Apr. 17, 1934 |
| 2,081,108 | Kilb | May 18, 1937 |
| 2,184,110 | Anderson | Dec. 19, 1939 |
| 2,197,740 | Bergstrom | Apr. 16, 1940 |
| 2,289,910 | Hanson | July 14, 1942 |
| 2,484,786 | Fall | Oct. 11, 1949 |
| 2,605,691 | Euwer | Aug. 5, 1952 |
| 2,698,569 | Reynolds et al. | Jan. 4, 1955 |